US009674156B2

(12) United States Patent
Stiglic et al.

(10) Patent No.: US 9,674,156 B2
(45) Date of Patent: Jun. 6, 2017

(54) EVENT-TRIGGERED RELEASE THROUGH THIRD PARTY OF PRE-ENCRYPTED DIGITAL DATA FROM DATA OWNER TO DATA ASSIGNEE

(71) Applicant: McAfee, Inc., Santa Clara, CA (US)

(72) Inventors: Anton Stiglic, Brossard (CA); Daniel Robichaud, Bromont (CA); Marc-Antoine Ross, Montreal (CA); Richard Bruno, St. Albans, VT (US)

(73) Assignee: McAfee, Inc., Santa Clara, CA (US)

( * ) Notice: Subject to any disclaimer, the term of this patent is extended or adjusted under 35 U.S.C. 154(b) by 59 days.

(21) Appl. No.: 14/421,131

(22) PCT Filed: May 8, 2013

(86) PCT No.: PCT/CA2013/050355
§ 371 (c)(1),
(2) Date: Feb. 11, 2015

(87) PCT Pub. No.: WO2013/170374
PCT Pub. Date: Nov. 21, 2013

(65) Prior Publication Data
US 2015/0195254 A1   Jul. 9, 2015

Related U.S. Application Data

(60) Provisional application No. 61/647,213, filed on May 15, 2012.

(51) Int. Cl.
*H04L 29/06* (2006.01)
*H04L 9/14* (2006.01)
(Continued)

(52) U.S. Cl.
CPC .......... *H04L 63/0428* (2013.01); *H04L 9/083* (2013.01); *H04L 9/0825* (2013.01);
(Continued)

(58) Field of Classification Search
CPC .............. H04L 9/14–9/16; H04L 63/04; H04L 63/0428; H04L 63/0442; H04L 63/045;
(Continued)

(56) References Cited

U.S. PATENT DOCUMENTS 8,701,109 B1 * 4/2014 Lazier ...................... G06F 8/63
711/101
2006/0085314 A1   4/2006 Grim et al.
(Continued)

OTHER PUBLICATIONS

Geier, Eric, PC World, Apr. 26, 2012, "How to Encrypt Your Email", PC World, retrieved from the internet: URL: https://web.archive.org/web/20120509194842; http://www.pcworld.com/article/254338/how_to_enrcypt_your_email.html, pp. 1-4, retrieved on Feb. 10, 2016.
(Continued)

*Primary Examiner* — Linglan Edwards
*Assistant Examiner* — Kevin Bechtel
(74) *Attorney, Agent, or Firm* — Blank Rome, LLP

(57) ABSTRACT

A future proof method and system for securely transferring digital data from a data owner to a data assignee through a third party involving securely registering the data owner possessing the digital data with the third party and securely predefining to the third party a trigger event associated with a data assignee, registering the data assignee with the third party, receiving encrypted digital data and an encrypted trigger event associated with the data assignee transmitted from the data owner to the third party, and securely transferring and releasing the digital data to the at least one data assignee by the third party upon validation by the third party of the occurrence of the trigger event in such a manner that digital data can be used by data assignee on data assignee system.

15 Claims, 7 Drawing Sheets

| LOCATIONS | Data Owner (DO) | Third Party (3P) | Data Assignee (DA) |
|---|---|---|---|
| KEYS AVAILABLE | DOPuKey<br>DOPrKey<br>DAPuKey<br>3PSPuKey | 3PSPuKey<br>3PSPrKey<br>DOPuKey<br>DAPuKey | DAPuKey<br>DAPrKey |
| WHAT IS ENCRYPTED | Digital Data<br>Digital Data Set<br>OSDdrec<br>ASDdrec<br>Trigger Event | | |
| WHAT IS DECRYPTED | Digital Data<br>OSDdrec<br>ASDdrec<br>Trigger Event (DDS*) | SDdrec<br>OSDdrec<br>ASDdrec<br>Trigger Event | Digital Data Set |

Responsibility of each party with respect to Encryption and Decryption

*Knows content taken from DD to form each DDS relative to each DA and Trigger Event

(51) Int. Cl.
*H04L 29/08* (2006.01)
*H04L 9/08* (2006.01)

(52) U.S. Cl.
CPC ............ *H04L 9/14* (2013.01); *H04L 63/0442* (2013.01); *H04L 63/061* (2013.01); *H04L 63/062* (2013.01); *H04L 67/20* (2013.01); *H04L 67/10* (2013.01)

(58) Field of Classification Search
CPC ............ H04L 63/0471; H04L 63/0478; H04L 63/061; G06F 21/602
See application file for complete search history.

(56) References Cited

U.S. PATENT DOCUMENTS

| | | | |
|---|---|---|---|
| 2006/0230395 A1* | 10/2006 | Paul ........................ | G06F 8/65 717/173 |
| 2008/0167994 A1 | 7/2008 | Li et al. | |
| 2008/0184334 A1* | 7/2008 | Hebert ................ | G06F 21/6218 726/1 |
| 2010/0131574 A1 | 5/2010 | Reese et al. | |
| 2011/0016182 A1 | 1/2011 | Harris | |
| 2012/0110327 A1* | 5/2012 | Doerner ................ | H04L 9/0827 713/165 |

OTHER PUBLICATIONS

European search report received in corresponding European patent application No. 13 790 2193, mail date Feb. 18, 2016.
Geier, Eric, "How to Encrypt Your Email", Internet article from PC World at URL:https://web.archive.org/web/20120509194842; http://pcworld.com/article/254338/how_to_encrypt_your_email.html; retrieved Feb. 10, 2016.

\* cited by examiner

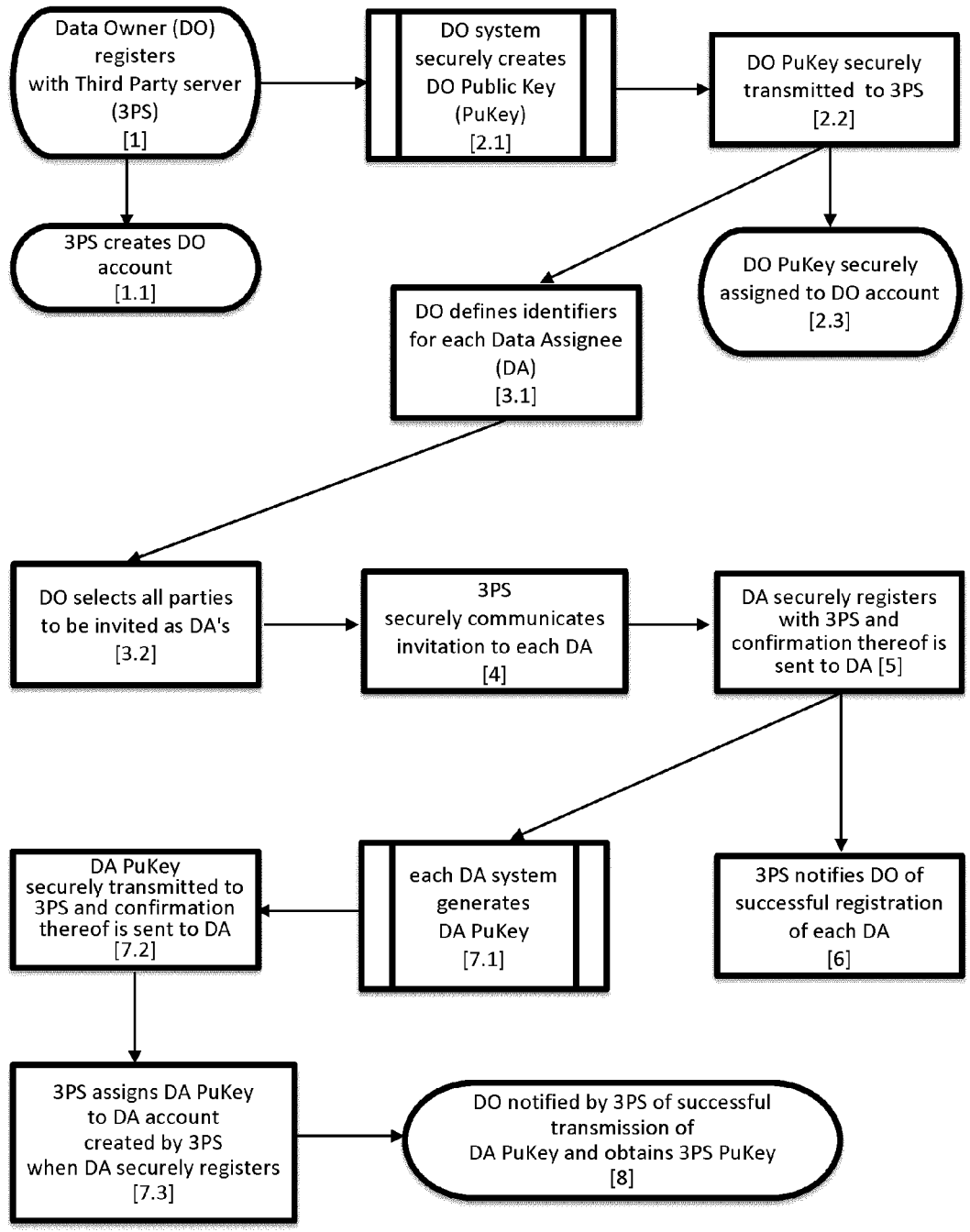
Figure 1 Registration with and transmission of public keys to a Third Party

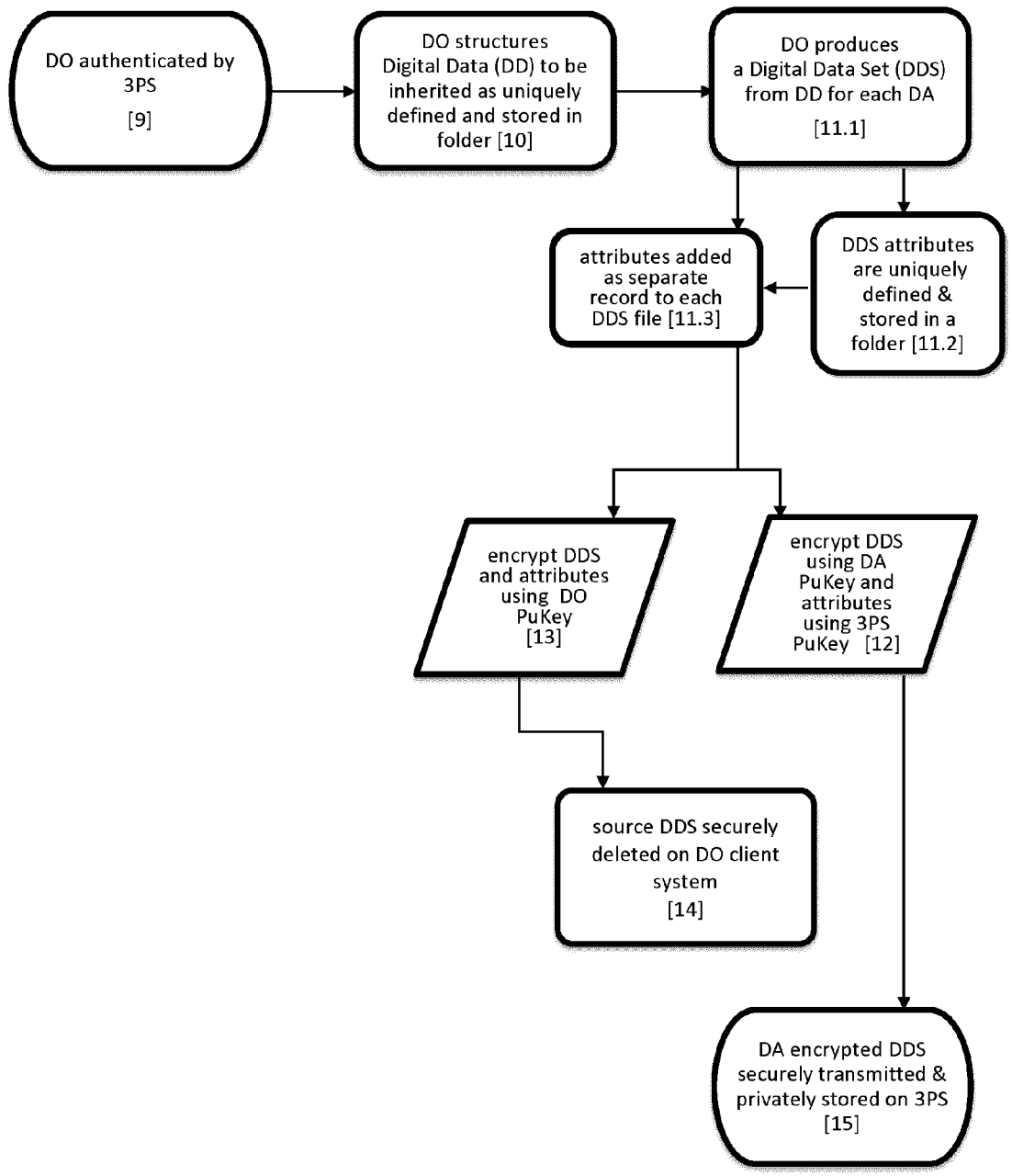
Figure 2 Encryption of Digital Data Sets and transmission of encrypted Digital Data Sets by Data Owner to Third Party

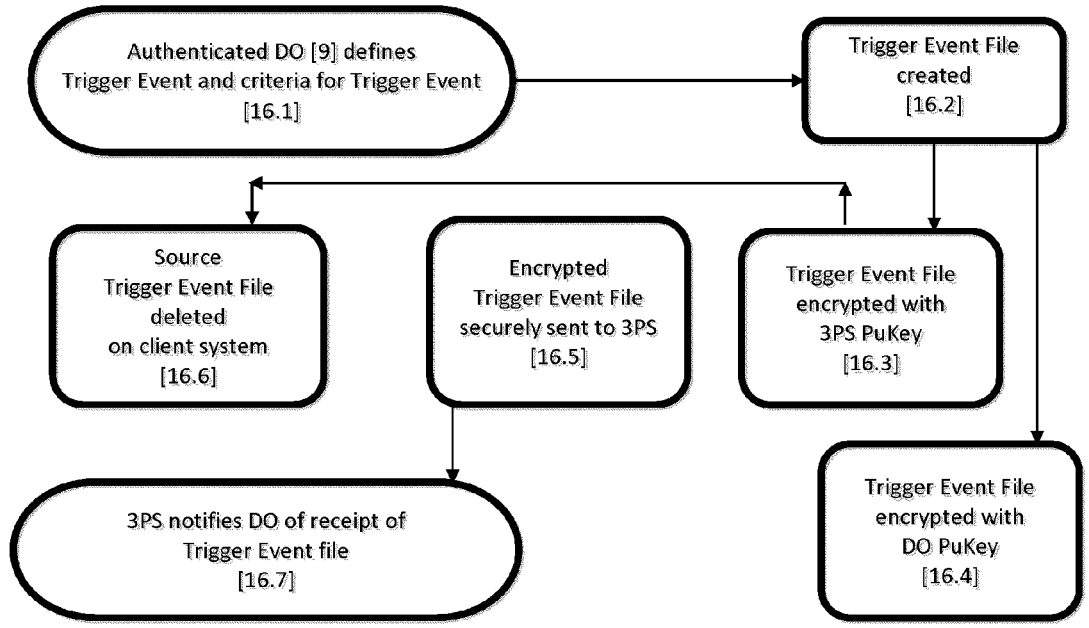
Figure 3a Trigger Event creation and transmission
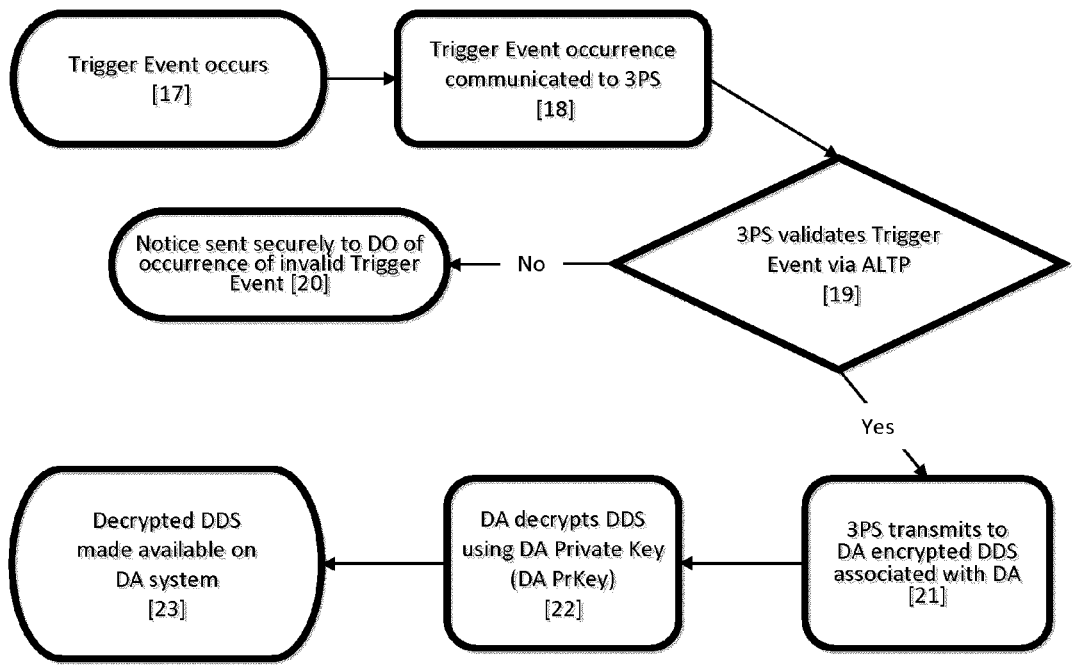
Figure 3b Third Party validation of Trigger Event to release pre-encrypted Digital Data Set(s)

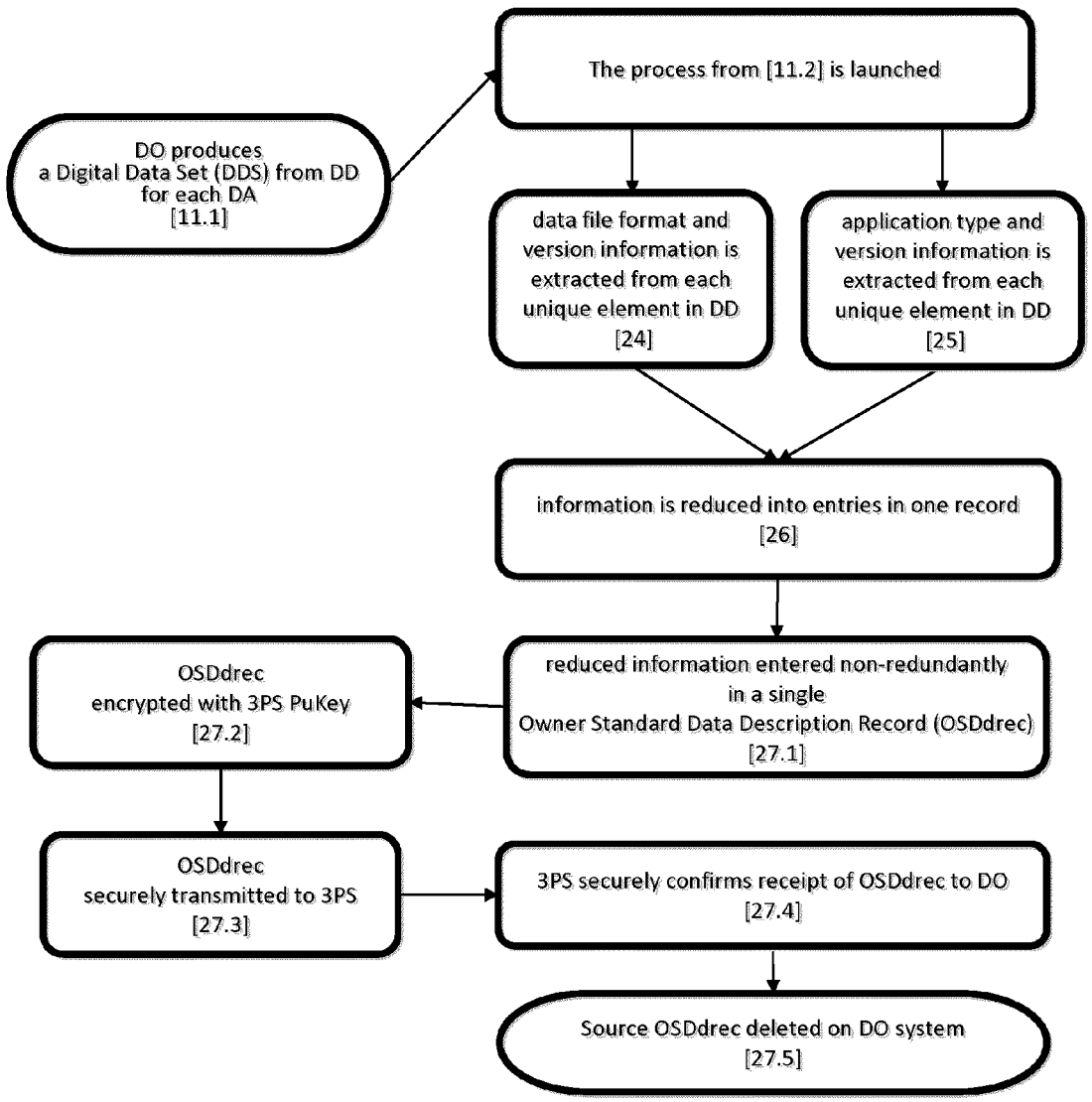
Figure 4a Defining and securing the Owner Standard Data Description Record

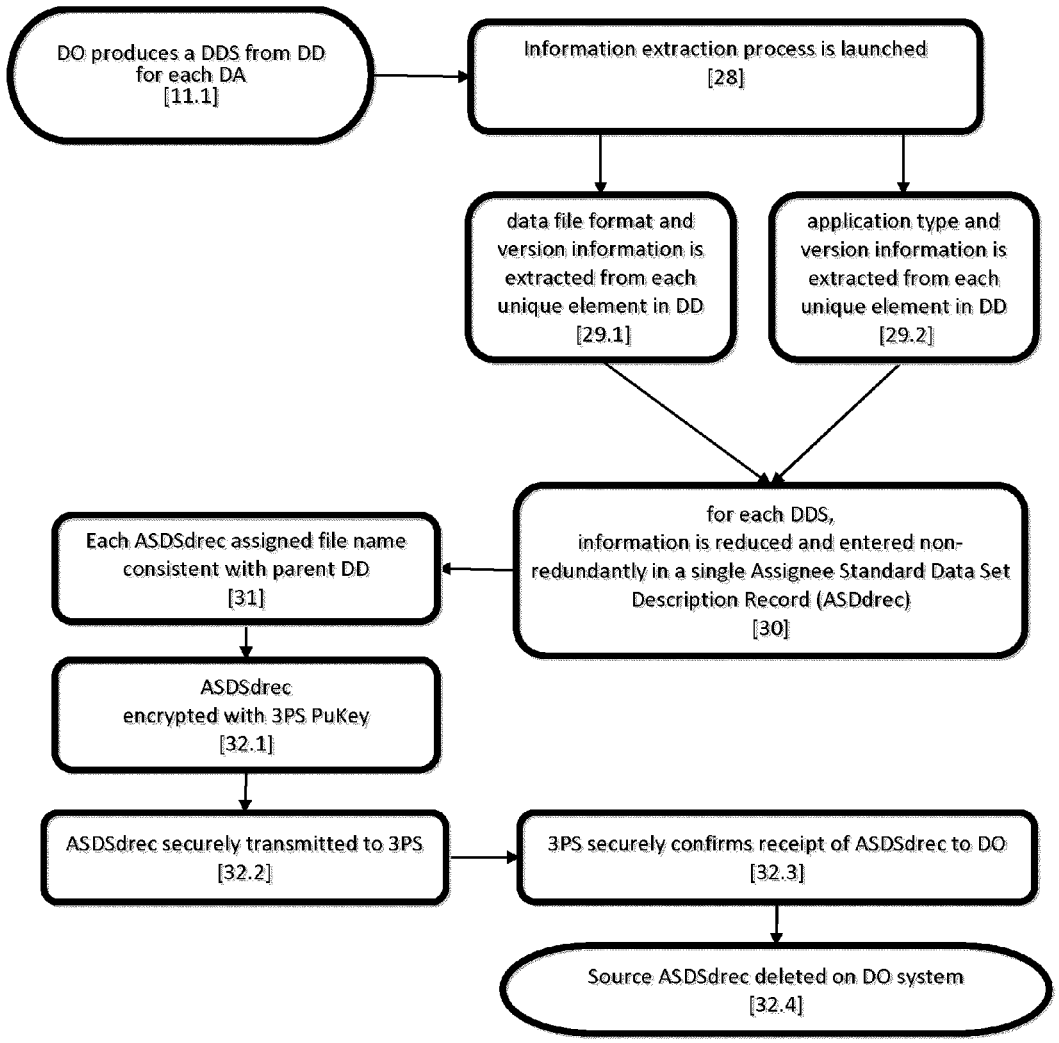
Figure 4b Defining and securing Assignee Standard Data Set Description Record

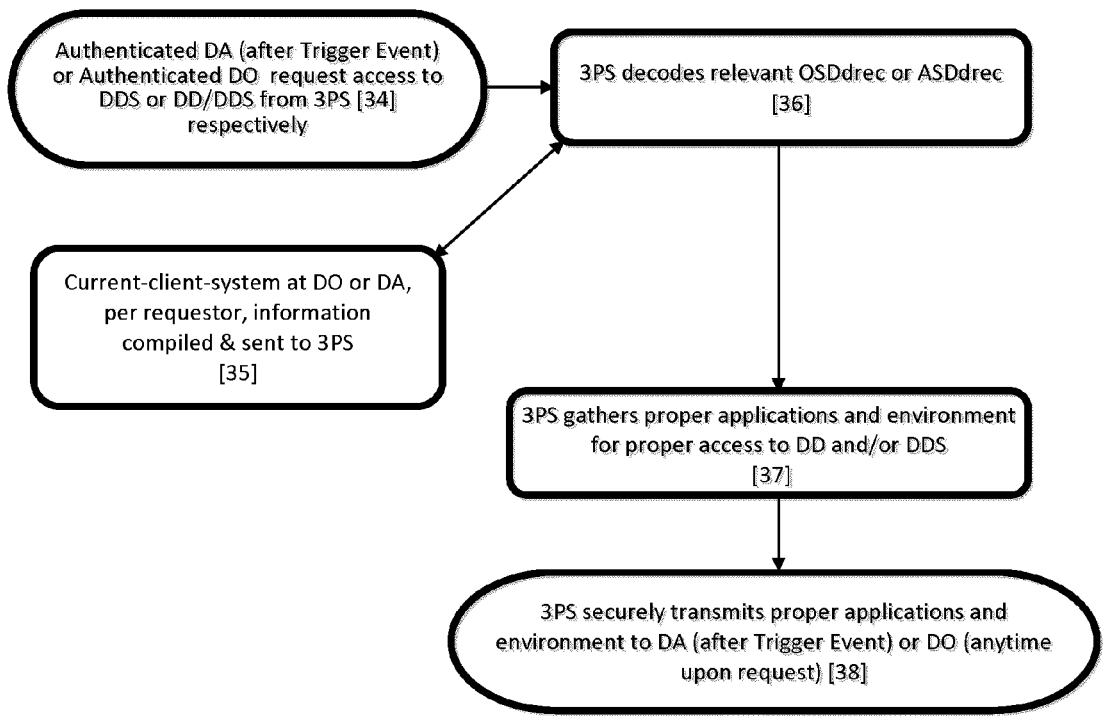
Figure 4c Selecting and transmitting applications/environment to assure Digital Data Set usability

| LOCATIONS | Data Owner (DO) | Third Party (3P) | Data Assignee (DA) |
|---|---|---|---|
| KEYS AVAILABLE | DOPuKey<br>DOPrKey<br>DAPuKey<br>3PSPuKey | 3PSPuKey<br>3PSPrKey<br>DOPuKey<br>DAPuKey | DAPuKey<br>DAPrKey |
| WHAT IS ENCRYPTED | Digital Data<br>Digital Data Set<br>OSDdrec<br>ASDdrec<br>Trigger Event | | |
| WHAT IS DECRYPTED | Digital Data<br>OSDdrec<br>ASDdrec<br>Trigger Event<br>(DDS*) | SDdrec<br>OSDdrec<br>ASDdrec<br>Trigger Event | Digital Data Set |

Figure 5: Responsibility of each party with respect to Encryption and Decryption

*Knows content taken from DD to form each DDS relative to each DA and Trigger Event

EVENT-TRIGGERED RELEASE THROUGH THIRD PARTY OF PRE-ENCRYPTED DIGITAL DATA FROM DATA OWNER TO DATA ASSIGNEE

FIELD OF THE INVENTION

The present invention generally relates to methods and processes for secure data storage, safeguarding of end-user usability of stored data into the future and communications thereof in association with a system of private/public key cryptography.

BACKGROUND

The proliferation of digital data for both personal and professional uses, in the form of electronic media such as music, documents, pictures, videos, passwords, among other types of electronic media and digital data, has led to a significant need for secure and reliable digital storage. With the advent of "cloud" computing, significant amounts of both personal and professional digital data is uploaded and saved to vast public servers that can be accessed from any internet connection.

As can be readily appreciated, some digital data is in fact of a sensitive nature, and the digital data owner desires that the digital data should be stored in an encrypted form that can only be decrypted by a data assignee that will receive the digital data at some future point in time. In other words, the data owner does not want the digital storage provided to be accessible by any unauthorized party. By way of a non-limiting example, a data owner may desire to store a sensitive document, such as a will, in an encrypted manner and only permit a designated executor to have the ability to decrypt the will. In this way, data owners can safely and securely store sensitive data without having any concerns that the integrity of the digital data will be compromised, such as in the event that the digital storage provider will be hacked by a rogue third party.

Further, data owners often want to safely store their digital data for an extended period and then transfer it to a data assignee upon some subsequent event that can occur in the future. To extend the example given above, a data owner may want to transfer the encrypted will to the designated executor upon the data owner's death.

Various prior art solutions exist for storing and transferring digital data, however there are no presently available solutions that allow a data owner to encrypt digital data, store the encrypted data on a third-party server such that the third party cannot access and view the encrypted data whilst providing future-proof access to the encrypted data and a suitable decryption process to a data assignee upon the verified occurrence of a previously determined event, such as a birthday of the data assignee or the death of the data owner, among any other previously determined event that will be readily contemplated by the suitably skilled person.

US 2004/0098366 discloses a method and system for secure electronic storage of private personal data preferably held in trust on behalf of a preselected corporation or natural person. Data owners and authorized persons gain access to accessible data to undertake permitted tasks.

WO97/21162 discloses a service methodology for time-based availability of content provisioned on a storage medium, wherein time is measured, and responsive to the measured time, access to the data content is permitted.

GB 2,403,382 discloses a method wherein a consumer is able to request encrypted content data from a content issuer for storage. At the predetermined time an encryption key is sent to the consumer to permit decryption of the encrypted content.

U.S. Pat. No. 6,603,857 discloses a method and apparatus for controlling release of time sensitive information by a server that establishes access information for a specific future time that only becomes active once that time has passed.

U.S. Pat. No. 8,224,725 discloses a method and system for escrowing digital data by receiving escrow conditions for releasing the escrowed data and an escrow recipient. An escrow contract is then created based on the specified parameters. When the condition has been satisfied, the escrow data is released to an escrow recipient.

U.S. Pat. No. 7,856,414 discloses a system and method for permanently archiving intellectual property in a digital archival system.

U.S. Pat. No. 7,716,732 discloses techniques for secure online storage where a user is registered for securely storing documents on a network server. The user documents can be viewed remotely upon receipt of a user security identifier. The user documents include documents for disposing and utilizing the user documents upon the occurrence of death or medical circumstances.

U.S. Pat. No. 7,441,277 discloses an electronic deposit box system and a related method of controlling access to electronic information, particularly suitable for electronic tendering.

U.S. Pat. No. 6,092,201 discloses a method and apparatus for extending secure communication operations via shared lists accomplished by creating a shared list in accordance with authorization parameters by one user and subsequently accessing the shared list via the authorization parameters by a group of users including the first user.

U.S. Pat. No. 7,421,741 discloses a system and method for encrypting digital content in a digital container and securely locking the encrypted content to a particular user and or computer or other computing device.

However, there is a need for a future-proof method and system that provides the event-trigger release of encrypted digital data from a data owner to a data assignee through a third party, such that only the third party provides access to the encryption and decryption process for encrypting or decrypting the data by and at the designated sender's or recipient's system respectively.

This background information is provided to reveal information believed by the applicant to be of possible relevance to the present invention. No admission is necessarily intended, nor should be construed, that any of the preceding information constitutes prior art against the present invention.

BRIEF SUMMARY

In at least one embodiment, the present invention provides a method for securely transferring digital data from a data owner to a data assignee through a third party comprising the steps of securely registering the data owner possessing the digital data with the third party, the data owner securely predefining to the third party at least one trigger event associated with at least one data assignee, securely receiving from the data owner a first public key, the first public key being stored and associated with the data owner by the third party, the data owner storing and retaining access to a first private key, the third party having a second public key which is associated with the third party, registering the at least one data assignee with the third party, securely receiving from the data assignee a third public key, the third public key being stored and associated with the data assignee by the third party, the data assignee storing and retaining access to a third private key, sending the second public key and the third public key to the data owner, encrypting the digital data with the first public key and the third public key and encrypting the at least one trigger event associated with at least one data assignee with the first public key and the second public key, receiving the encrypted digital data and the encrypted at least one trigger event associated with at least one data assignee transmitted from the data owner to the third party; and securely transferring and releasing the digital data to the at least one data assignee by the third party upon validation by the third party of the occurrence of the at least one trigger event, the digital data being decrypted using the third private key.

In another embodiment, the present invention provides a system for securely transferring digital data from a data owner to a data assignee through a third party, the system comprising registration means for securely registering the data owner possessing the digital data with the third party, the data owner securely predefining to the third party at least one trigger event associated with at least one data assignee, communication and storage means for securely receiving from the data owner a first public key, the first public key being stored and associated with the data owner by the third party, the data owner storing and retaining access to a first private key, the third party having a second public key which is associated with the third party, registration means for registering the at least one data assignee with the third party, communication and storage means securely receiving from the data assignee a third public key, the third public key being stored and associated with the data assignee by the third party, the data assignee storing and retaining access to a third private key, communication means for sending the second public key and the third public key to the data owner, encryption means for encrypting the digital data with the first public key and the third public key and encrypting the at least one trigger event associated with at least one data assignee with the first public key and the second public key, communication means for receiving the encrypted digital data and the encrypted at least one trigger event associated with at least one data assignee transmitted from the data owner to the third party, and communication, validation and decryption means for securely transferring and releasing the digital data to the at least one data assignee by the third party upon validation by the third party of the occurrence of the at least one trigger event, the digital data being decrypted using the third private key.

In another embodiment, the present invention provides a method for securely transferring digital data from a data owner to a third party comprising the steps of securely registering the data owner possessing the digital data with the third party, the data owner securely predefining to the third party at least one trigger event associated with at least one data assignee, securely receiving from the data owner a first public key, the first public key being stored and associated with the data owner by the third party, the data owner storing and retaining access to a first private key, the third party having a second public key which is associated with the third party, securely receiving the encrypted digital data from the data owner to the third party, registering the at least one data assignee with the third party, securely receiving from the data assignee a third public key, the third public key being stored and associated with the data assignee by the third party, the data assignee storing and retaining access to a third private key, sending the second public key and the third public key to the data owner, receiving the encrypting the digital data with the first public key and the third public key and encrypting the at least one trigger event associated with at least one data assignee with the first public key and the second public key, and receiving the encrypted digital data and the encrypted at least one trigger event associated with at least one data assignee transmitted from the data owner to the third party.

In another embodiment, the present invention provides a method for securing future use of digital data transferred from a data owner to a third party comprising the steps of securely registering the data owner possessing the digital data with the third party, the digital data having at least one digital file, each at least one digital file having a corresponding at least one standard data description record, the data owner securely predefining to the third party at least one trigger event associated with at least one data assignee, securely receiving from the data owner a first public key, the first public key being stored and associated with the data owner by the third party, the data owner storing and retaining access to a first private key, the third party having a second public key which is associated with the third party, securely receiving the encrypted digital data from the data owner to the third party, registering the at least one data assignee with the third party, securely receiving from the data assignee a third public key, the third public key being stored and associated with the data assignee by the third party, the data assignee storing and retaining access to a third private key, sending the second public key and the third public key to the data owner, encrypting the digital data with the first public key and the third public key and encrypting the at least one trigger event associated with at least one data assignee with the first public key and the second public key and encrypting the at least two standard data description records with the first public key and the second public key, receiving the encrypted digital data and the encrypted at least one trigger event associated with at least one data assignee and the encrypted at least two standard data description records from the data owner.

BRIEF DESCRIPTION OF THE DRAWINGS

The present invention will be better understood in connection with the following Figures, in which:

FIG. 1 is a flowchart diagram illustrating the process by which Data Owner and Data Assignee(s) register with and transmit their public keys to a Third Party, according to an embodiment of the invention.

FIG. 2 is a flowchart diagram illustrating the process by which Data Owner encrypts and transmits encrypted Digital Data and Digital Data Sets to a Third Party, according to an embodiment of the invention.

FIGS. 3a to 3b are the flowchart diagrams illustrating the process by which the trigger event is created, encrypted and transmitted to a Third Party and then how the Third Party validates the occurrence of the Trigger Event to release the pre-encrypted Digital Data Set(s) to the Data Assignee(s), according to an embodiment of the invention.

FIGS. 4a to 4c are flowchart diagrams illustrating the process by which the Third Party assures that the decoding tools required for use, execution and/or viewing the decrypted data by Data Owner or Data Assignee(s) are retained in a Future-Proof Usability state, according to an embodiment of the invention.

FIG. 5 is a table illustrating the responsibility of each party in the present method and system with respect to encryption and decryption, according to an embodiment of the present invention.

DETAILED DESCRIPTION OF THE EMBODIMENTS

The present invention provides a future-proof method and system for securely event-trigger releasing a digital data set from a data owner through a third party such that the third party provides the encryption/decryption process directly to the data owner and data assignee and stores and transfers, upon event-trigger, the digital data obtained from the data owner.

The following definitions will be used throughout the following specification:

Data Owner (also referred to as the "DO"): The person or persons, service or services that defines the party that possesses Digital Data for sharing, as will be discussed in further detail below. It is contemplated that the Data Owner can be an asset originator or owner. According to at least one embodiment of the present invention, the Data Owner may encrypt and transmit Digital Data and Digital Data Sets to a Third Party, as discussed below. The Data Owner chooses which Data Assignee will receive which Digital Data Set, where it is contemplated that the Digital Data Set can include a part or the whole of Digital Data, and declares which specified event(s) should be a Trigger Event(s), and under what criteria, the release of the Digital Data Set(s) to a Data Assignee is effected, as discussed below.

Data Assignee (also referred to as the "DA"): A person, service, or party that has been defined, at any time before a Trigger Event, by the Data Owner. It is contemplated that the Data Assignee can be identified by both a unique name and detailed coordinates by the Data Owner, among other identifying characteristics that will readily be understood by the skilled person. It is contemplated that the Data Assignee can receive a portion of the Digital Data (which will be pre-encrypted), as predefined by the Data Owner in their Digital Data Set, after a Trigger Event that has occurred and was validated through the third party digital storage provider by an Arm's Length Third Party, as will be discussed in greater detail below.

Third Party: The third party digital storage provider responsible for obtaining and storing encrypted Digital Data and Digital Data Sets, and managing the interactions between the Data Owner and the Data Assignee through communicating notices, events, invitations, among other methods of communication that will be readily understood by the skilled person. It is further contemplated that the Third Party distributes the relevant portion of the Data Owner's Digital Data (called the Digital Data Set as further discussed below) when authorized to do so. The Third Party is also responsible for the arm's length validation of the occurrence of the Trigger Event by an Arm's Length Third Party as defined by the criteria pre-established by Data Owner, as will be discussed in further detail below.

Third Party Server (also referred to as the "3PS"): The Third Party Server is the environment and means which carries out services of the Third Party. In at least one embodiment, it is contemplated that the Third Party Server is a cloud computing server having internet access for both the Data Owner and the Data Assignee, among other arrangements as will be readily understood by the skilled person.

Invitation: Any traceable, original and unmanipulated, electronic communication that serves as an invitation, such as, but not limited to an SMS code, an email link, a card holding a code, among other electronic communications that will be readily understood by the skilled person.

Digital Data (also referred to as the "DD"): Any digital information, for example a username plus password combination, software code, data files, digital media such as a photo, music, video, a document, text, notes, binary string, among any other digital information that will be readily understood by the skilled person.

Trigger Event (also referred to as the "TE"): Any one predefined event, of a set of predefined events defined by the Data Owner, which can be in a predefined encoded event format and which is placed in a secure data record. A Trigger Event can be an event such as, but not limited to, death of a living being, birth of a child, war, election, business or personal transaction, among other types of predetermined event, as declared by the Data Owner prior to the occurrence of any such predetermined event. This event can and will be validated by the Third Party through the Third Party Server using the impartial Arm's Length Third Party based on the Data Owner's predefined criteria. It is contemplated that "predefined" or "preselected" means defined or selected prior to the occurrence in time of a Trigger Event, as will be readily understood by the skilled person.

Digital Data Set (also referred to as the "DDS"): The specific data which is any part of Digital Data pre-selected before the Trigger Event by the Data Owner which is to be solely transferred to the Data Assignee upon the Trigger Event related to that Digital Data Set. It is contemplated that the Digital Data may contain multiple Digital Data Sets that may be designated for transfer to multiple Digital Assignees, or alternatively the Digital Data Set may be completely co-extensive and coterminous with the Digital Data, among other arrangements that will be readily understood by the skilled person.

Standard Data Description Record (also referred to as the "SDdrec"): The Standard Data Description Record is any encrypted record associated uniquely and in one-to-one correspondence with a file of Digital Data or Digital Data Set. It is contemplated that the Standard Data Description Record contains the necessary format plus application and version information for the data in its associated file. It is also contemplated that there is one Standard Data Description Record for each independently encrypted file of the Digital Data (the Standard Data Description Record for Digital Data files is hereinafter called "OSDdrec") or the Digital Data Set (the Standard Data Description Record for Digital Data Set files is hereinafter called "ASDdrec"). It is further contemplated that the SDdrec, the OSDdrec and the ASDdrec can be directly associated with the corresponding file and has the same unique identifier as the file it is associated with but it has a different extension and is encrypted solely with a Third Party public key. As such, it is contemplated that solely the Third Party can decrypt this record as it does not contain data asset information.

Arm's Length Third Party (also referred to as "ALTP"): The Arm's Length Third Party is the skilled person that has the responsibility, expertise, legal capability and liability capacity to validate and certify the occurrence of a Trigger Event and the thereto related criteria, as will be readily understood by the skilled person.

Future-Proof Usability: Any such methods and tools for reading and/or executing any of the data in Digital Data or Digital Data Set that can be maintained in an up-to-date fashion relative to changes in hardware and software environments over time. In this way, it is contemplated that the present invention is agnostic with respect to the particular technology that is employed to encrypt/decrypt, read, store and transfer the Digital Data and the Digital Data Set, such that the Digital Data can be accessed by the Data Owner and the Digital Data Set can be transferred to the Data Assignee despite any changes to encryption, system environments, applications, storage and transfer technology that may occur in the future.

In accordance with at least one embodiment of the present invention, there is provided a method and process for securely event-trigger releasing Digital Data through a Third Party, having the steps of securely registering with the Third Party (that is, a third party digital data storage provider) a Data Owner (that is, the party that has the rights to use, make use and transfer the data whether or not generated by the party) possessing the owner Digital Data, registering with the Third Party at least one designated Data Assignee (that is, a data-receiving party that has the rights of receiving at least a portion of the Digital Data from the Data Owner at some point in time after the receipt of the Digital Data), the Data Owner securely predefining to the Third Party at least one Trigger Events associated with each of the at least one designated Data Assignee and securely transferring and releasing the Digital Data to the at least one designated Data Assignee by the Third Party upon a specific Trigger Event only after successful validation by the Third Party (in some embodiments through an Arm's Length Third Party) of the occurrence of the specific Trigger Event.

In at least one embodiment, the Data Owner possesses and/or owns Digital Data. The Digital Data may be located on at least one device, including such devices as a computer, typical server, "cloud" server, among other types of devices that will be readily understood by the skilled person. It is contemplated that the Data Owner can further select a subset of the Digital Data to create a Digital Data Set, for sharing with the designated Data Assignee.

In at least one embodiment, registering the designated Data Assignee can include sending an invitation from the Data Owner to the Data Assignee by way of the Third Party and accepting the invitation by the Data Assignee.

In at least one embodiment, upon securely transferring and releasing the Digital Data Set, designated Data Assignees may, on the Data Assignee's system, decrypt and subsequently use the Digital Data Set.

Therefore, in at least one embodiment, the present invention provides a method and system for securely storing user encrypted Digital Data in a Third Party environment where a Digital Data Set of the encrypted Digital Data will be securely transmitted to the designated Data Assignee by the Third Party. The encrypted Digital Data Set is only trigger-released at a specific Trigger Event, predefined by the Data Owner, after the Third Party has validated the occurrence of the Trigger Event. Once transmitted, only the designated Data Assignee can decrypt the Digital Data Set.

In at least one embodiment of the present invention, a third party pre-encrypted digital data delivery process based on a public/private key infrastructure in the context of a client-server system is provided, wherein the server resources may be in the cloud, as will be described hereinafter. Although the invention is described in terms of specific illustrative embodiments as present below, it is to be understood that the embodiments described herein are by way of example only and that the scope of the invention is not intended to be limited thereby.

With reference to FIG. 1, in at least one embodiment of the present invention a Data Owner (DO) securely registers with a Third Party Server (3PS) [1] accessible through a network, such as the Internet, a local area network or a wireless network, among other networks that will be readily understood by the skilled person. The 3PS is accessible through a client interface such as a web browser or any software module having a text and/or graphical user interface on any other device such as a personal computer, smart phone or a mobile phone. The 3PS may be a server hosted by a third party. Following the registration of a Data Owner account [1], a public key (DO PuKey) is securely created by the Data Owner's system [2.1] and is securely transmitted to the 3PS [2.2]. This key is then securely assigned to the Data Owner's account [2.3] which is created by the 3PS at registration[1.1]. The Data Owner then defines, in detail, the identifiers of each Data Assignee (DA) [3.1] and securely invites at least one DA's [3.2] as potential future owners of at least one Digital Data Sets. The 3PS securely communicates an invitation to each Data Assignee [4] through any communication means available, such as but not limited to email or SMS among other arrangements, and once all Data Assignees have been invited this process is terminated. Each Data Assignee can then securely register with the 3PS with a confirmation notice securely sent by the 3PS to the Data Assignee [5]. Also it is contemplated that a confirmation notice can be securely sent by the 3PS to the Data Owner upon successful registration of each Data Assignee [6]. Each Data Assignee's system securely generates a public key (DA PuKey) [7.1] and securely transmits the public key to the 3PS with a confirmation notice securely sent by the 3PS to the Data Assignee [7.2]. The 3PS then securely assigns this key to the Data Assignee account which was created at registration[7.3]. A notice of successful public key generation as well as transmission of the Data Assignee public key can then be securely sent to the Data Owner [8]. All transmissions can then be sent securely over the communications path selected and this process can be repeated at any time whenever a new Data Assignee defined by Data Owner.

It should be noted that as with any typical public-key infrastructure ("PKI") infrastructure the DO and DA private keys (DO PrKey and DA PrKey) may be created on the systems of DO and DA respectively upon receipt of the respective public keys. It is contemplated that the DO PrKey and DA PrKey may be secured on their respective systems such that such keys are not discoverable.

Turning to FIG. 2, at least one embodiment of the present invention is illustrated where, after being authenticated by 3PS [9], the Data Owner selects all Data Owner's data which may be 'inherited' (or in other words, transferred from Data Owner) at any Trigger Event by any Data Assignee and can place the Digital Data (DD) in a uniquely defined folder [10]. Then the Data Owner chooses, from the Digital Data, for each Data Assignee at least one Digital Data Set [11.1] related to that Data Assignee and the Digital Data Set (DDS) attributes are defined as selected data in a uniquely defined folder [11.2] and appended as a separate record to the Digital Data and Digital Data Set such that they are solely accessible to the Third Party [11.3]. Before the Digital Data Set can be uniquely associated with and held for a Data Assignee, the Digital Data Set folder associated with that Data Assignee and an associated Trigger Event needs to be, on the one hand, encrypted for each Data Assignee using that Data Assignee's public key [12], and, on the other hand, its attributes record and the Trigger Event need to be made available for decryption by 3PS under their Third Party private key. The latter is assured by encrypting this record and the Trigger Event with the 3PS's public key (also within step [12]). The Data Owner can retain an encrypted copy of each Digital Data Set which has been encrypted with its attributes record using the Data Owner's public key [13]. Once these folders with attributes are in encrypted form, the source Digital Data Sets are securely deleted on the system [14]. Thereafter the encrypted Digital Data Sets are securely transmitted to the 3PS [15] and privately stored on the Third Party Server. They are made available to the Data Assignee after a validated Data Assignee Trigger Event occurs. This process can be repeated at any time before Trigger Event if initiated by an authenticated Data Owner [9].

Turning to FIG. 3, at least one embodiment of the present invention is illustrated where the Data Owner defines each Trigger Event and for each Trigger Event at least one criterion for the Trigger Event [16.1]. Each of these components is in a predefined format within one record and all are contained within one file [16.2]. This file is encrypted with the Third Party's public key (3PS PuKey) [16.3], securely sent to 3PS [16.5] and, once encrypted, the source file is securely deleted on the client system [16.6]. Further, the file can be encrypted using the Data Owner's public key for storage on the Data Owner's device [16.4]. The 3PS securely sends a notice of receipt to Data Owner upon successful receipt and storage of Trigger Event file [16.7]. This process can be repeated at any time before Trigger Event is initiated, by an authenticated Data Owner [9]. When a Trigger Event occurs [17] and is securely communicated to 3PS [18] the predefined validation process is then initiated by the 3PS [19]. If the validation findings (which can be in at least one embodiment provided by an Arm's Length Third Party (ALTP) selected by the Third Party), do not satisfy Data Owner criteria then a notice to this effect is securely sent to the Data Owner [20]. When findings (which can be in at least one embodiment provided by an Arm's Length Third Party selected by the Third Party) satisfy Data Owner criteria and so are deemed validated, the 3PS releases and transmits the encrypted Digital Data Set(s) uniquely associated with each Data Assignee [21] that is predefined by Data Owner under the Trigger Event (for each Trigger Event (TEi) and any Data Assignee (DAj) a Digital Data Set (DDS(TEi, DAj) can be released) and has already been uniquely encrypted with the Data Assignee public Key (DAPuKeyj)). Finally, the Digital Assignee can decrypt their Digital Data Set using their private key (DAPrKeyj) [22] and the data from the Data Assignee Digital Data Set is available to the Data Assignee on their system [23]. The decrypting is part of an asymmetric process and makes use of at least one encryption algorithms such as but not limited to Diffie-Hellman, RSA, among other encryption algorithms that will be readily understood by the skilled person.

Turning to FIGS. 4a to 4c, at least one embodiment of the present invention is illustrated where Digital Data is composed of at least one files each having one record associated with each file of Digital Data. This record per Digital Data file is called the Standard Data Description Record (SDdrec). When Data Owner gathers and structures Digital Data prior to encryption and communication (as illustrated in FIG. 2 at [11.1]) an additional process can be launched [11.2]. This additional process extracts any data such as but not limited to file format and version information [24] as well as application type and application version information [25] of each unique data element in the Digital Data, among other types of file data that will be readily appreciated by the skilled person, and reduces this information into entries in one record [26] (see, for example, FIG. 4a). The record's data entries are single-counted in that only one non-redundant data set of such file format and version information as well as application type and application version information entries is retained [27.1]. The whole of these entries in the record is called the Owner Standard Data Description Record (OSDdrec) which prior to encryption, the record is assigned the same unique name, but a different extension, as the data it is associated with and, after first being encrypted with the 3PS public key [27.2], it is securely transmitted to the 3PS [27.3]. The 3PS, upon successful receipt thereof, securely sends a confirmation notice to Data Owner [27.4] who then securely deletes source record on the Data Owner's system [27.5] and only the encrypted record is retained. As such, solely the Third Party can decrypt this 3PS public key encrypted record to assure Future-Proof Usability of Digital Data by Data Owner in the future.

Furthermore, as shown in FIG. 4b, upon producing the Digital Data Set for each Data Assignee (as illustrated in FIG. 2 at [11.1]) a separate process [28] extracts the data file format and version information [29.1] and application type and application version information [29.2] of all data in each Digital Data Set at the Data Owners system and reduces, for each Digital Data Set, its record data to one non-redundant set of data entries to be stored, for each Digital Data Set, in a record called the Assignee Standard Data Description Record (ASDdrec) [30]. Prior to encryption, each record is assigned the same unique name, but a different extension, as the data it is associated with [31]. Each of these records is then encrypted with a 3PS public key (3PS PuKey) [32.1] then the record is securely transmitted to 3PS [32.2] and 3PS, upon successful receipt thereof, securely sends a confirmation notice to Data Owner [32.3]. Finally, the source record is securely deleted by the Data Owner's system [32.4] and only the encrypted record is retained. As such, solely the Third Party can decrypt this record to assure Future-Proof Usability of Digital Data Set by Data Assignee in the future.

This information is used by the Third Party to maintain current, into the future, all decoding software tools and environments for data viewing and software execution on current platforms (i.e. platforms used at any point in time after encrypted information has been encrypted, transmitted and stored on Third Party Server) [35]. In the case that authenticated Data Owner or a Data Assignee (after a Trigger Event) needs to view data or execute software from Digital Data at some point in time [34] 3PS can supply either Data Owner or a Data Assignee (after a Trigger Event) the applications and environment to assure proper viewing or execution of data. This is done by decoding the relevant Standard Data Description Record [36] after gathering the proper applications and environment tools once the current DO and/or DA client systems' environment and applications are known [35] in order to assure proper viewing or execution of data [37] and securely transmitting them to Data Owner (anytime) or the Data Assignee(s) (only after appropriate Trigger Event) [38] (see, for example, FIG. 4c). This process can be repeated at any time before Trigger Event and is initiated after authenticated Data Owner (see, for example, FIG. 2 at [9]) has changed content or structure of Digital Data or Digital Data Set(s) (i.e. after end of [24] in FIG. 2).

Turning to FIG. 5, the responsibility of each party with respect to encryption and decryption is illustrated in accordance with at least one embodiment of the present invention. As will be readily understood by the skilled person, the Data Owner can encrypt all elements of the system with the Data Owner public key (DO PuKey), and can decrypt the Digital Data, Trigger Event file, Owner Standard Data Description Record (OSDdrec), and the Assignee Standard Data Description Record (ASDdrec) with the Data Owner private key (DO PrKey). The Third Party provides a Third Party public key (3PS PuKey) to the Data Owner for encrypting the Trigger Event file, Owner Standard Data Description Record (OSDdrec), and the Assignee Standard Data Description Record (ASDdrec) and has a Third Party Private Key (3PS PrKey) for decrypting the Trigger Event file, Owner Standard Data Description Record (OSDdrec), and the Assignee Standard Data Description Record (ASDdrec). The Data Assignee provides a Data Assignee public key (DA PuKey) to the Data Owner through the Third Party for encrypting the Digital Data Set, and has a Digital Assignee private key (DA PrKey) for decrypting the Digital Data Set.

Numerous modifications could be made to any of the embodiments described above without departing from the scope of the present invention. Further, it is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The embodiments of the invention for which an exclusive property or privilege is claimed are defined as follows:

1. A method for securely transferring digital data from a data owner to a data assignee through a third party comprising:
  receiving, from the data assignee by a server associated with the third party, a public key of the data assignee;
  sending, from the server associated with the third party to the data owner, the public key of the data assignee and a public key of the third party;
  receiving by the server associated with the third party from the data owner:
    a data description record describing software tools and environments for data viewing and software execution, the data description record comprising file format information corresponding to the digital data and system and application information corresponding to a computing environment necessary to assure proper viewing or execution of the digital data, the data description record encrypted with the public key of the third party;
    a trigger event information associated with the data assignee, the trigger event information encrypted with the public key of the third party; and
    the digital data encrypted with the public key of the data assignee;
  maintaining, by the server associated with the third party, software applications and environments for proper viewing or execution of the digital data in accordance with the data description record;
  recognizing, by the server associated with the third party, the occurrence of the trigger event associated with the data assignee; and
  sending, from the server associated with the third party to the data assignee after recognizing the occurrence of the trigger, the digital data encrypted with the public key of the data assignee and the software applications and environments necessary for proper viewing or execution of the digital data.

2. The method of claim 1, further comprising:
  registering the data owner with the third party; and
  registering the data assignee with the third party.

3. The method of claim 2, further comprising:
  transmitting to the data owner a notice of successful registration of the data assignee upon registering the data assignee.

4. The method of claim 1, further comprising:
  storing the public key of the data assignee.

5. A system for securely transferring digital data from a data owner to a data assignee through a third party, the system comprising:
  one or more computer processors; and
  a non-transitory computer-readable storage device communicatively coupled to the one or more computer processors, wherein the storage device stores instructions that when executed cause at least some of the one or more computer processors to perform operations comprising:
    receive a public key of the data assignee from the data assignee;
    send the public key of the data assignee and a public key of the third party to the data owner;
    receive from the data owner:
      a data description record describing software tools and environments for data viewing and software execution, the data description record comprising file format information corresponding to the digital data and system and application information corresponding to a computing environment necessary to assure proper viewing or execution of the digital data, the data description record encrypted with the public key of the third party;
      a trigger event information associated with the data assignee, the trigger event information encrypted with the public key of the third party; and
      the data encrypted with the public key of the data assignee;
    maintain software applications and environments for proper viewing or execution of the digital data in accordance with the data description record;
    recognize, by the third party, an occurrence of the trigger event corresponding to the trigger event information; and
    send, to the data assignee after recognizing the occurrence of the trigger, the digital data encrypted with the public key of the data assignee and the software applications and environments necessary for proper viewing or execution of the digital data.

6. The system of claim 5, wherein the instructions further comprise instructions that when executed cause at least some of the one or more hardware processors to:
  register the data owner with the third party; and
  register the data assignee with the third party.

7. A non-transitory computer-readable storage device with computer-executable instructions stored thereon that, when executed by one or more computer processors, cause the one or more computer processors to perform operations comprising:
  receive a public key of the data assignee from the data assignee;
  send the public key of the data assignee and a public key of the third party to the data owner;
  receive from the data owner:
    a data description record describing software tools and environments for data viewing and software execution, the data description record comprising file format information corresponding to the digital data and system and application information corresponding to a computing environment necessary to assure proper viewing or execution of the digital data, the data description record encrypted with the public key of the third party;
    a trigger event information associated with the data assignee, the trigger event information encrypted with the public key of the third party; and the data encrypted with the public key of the data assignee;

maintain software applications and environments for proper viewing or execution of the digital data in accordance with the data description record;

recognize, by the third party, an occurrence of the trigger event corresponding to the trigger event information; and send, to the data assignee after recognizing the occurrence of the trigger, the digital data encrypted with the public key of the data assignee and the software applications and environments necessary for proper viewing or execution of the digital data.

8. The non-transitory computer-readable storage device of claim 7, further comprising further computer-executable instructions for receiving a notice of successful receipt of the digital data from the third party.

9. The non-transitory computer-readable storage device of claim 8, further comprising further computer-executable instructions for deleting the digital data upon receiving the notice of successful receipt.

10. The non-transitory computer-readable storage device of claim 7, further comprising further computer-executable instructions for deleting the trigger event information after sending the encrypted trigger event information to the third party.

11. The non-transitory computer-readable storage device of claim 7, further comprising further computer-executable instructions for sending an additional encrypted trigger event information to the third party.

12. The non-transitory computer-readable storage device of claim 7, further comprising further computer-executable instructions for:

modifying the trigger event information;

encrypting the modified trigger event information using the public key of the third party; and sending the encrypted modified trigger event information to the third party.

13. The non-transitory computer-readable storage device of claim 7, further comprising further computer-executable instructions for:

receiving a notice of unsuccessful receipt of the encrypted trigger event information from the third party.

14. The non-transitory computer-readable storage device of claim 7, further comprising further computer-executable instructions for:

receiving a notice of unsuccessful validation of a trigger event from the third party.

15. The non-transitory computer-readable storage device of claim 7, further comprising further computer-executable instructions for:

receiving a notice of successful validation of a trigger event from the third party.

* * * * *